US010558007B2

(12) United States Patent
Brown et al.

(10) Patent No.: US 10,558,007 B2
(45) Date of Patent: Feb. 11, 2020

(54) ENCLOSURE FOR LOCAL CONVERGENCE POINT FOR FIBER OPTIC COMMUNICATIONS NETWORK (71) Applicant: Corning Research & Development Corporation, Corning, NY (US)

(72) Inventors: Jason J Brown, Keller, TX (US); Fernando Martinez Esteves, Reynosa Tamaulipas (MX); Catherine Victoria McNaught, Conover, NC (US); Jose Martinez Sanchez, Reynosa Tamaulipas (MX)

(73) Assignee: Corning Research & Development Corporation, Charlotte, NC (US)

( * ) Notice: Subject to any disclaimer, the term of this patent is extended or adjusted under 35 U.S.C. 154(b) by 0 days.

(21) Appl. No.: 16/298,154

(22) Filed: Mar. 11, 2019

(65) Prior Publication Data
US 2019/0285820 A1 Sep. 19, 2019

Related U.S. Application Data (60) Provisional application No. 62/642,385, filed on Mar. 13, 2018.

(51) Int. Cl.
G02B 6/44 (2006.01)
H04Q 1/02 (2006.01)
(52) U.S. Cl.
CPC ......... *G02B 6/4452* (2013.01); *G02B 6/4455* (2013.01); *H04Q 1/09* (2013.01)
(58) Field of Classification Search
None
See application file for complete search history.

(56) References Cited

U.S. PATENT DOCUMENTS

| 4,697,874 A | 10/1987 | Nozick |
| 5,734,776 A | 3/1998 | Puetz |
| 6,009,223 A | 12/1999 | Arizpe |
| 6,539,160 B2 | 3/2003 | Battey et al. |
| 2007/0047895 A1 | 3/2007 | Parikh et al. |
| 2011/0211799 A1 | 9/2011 | Conner et al. |
| 2019/0072736 A1 | 3/2019 | Glatzl et al. |

FOREIGN PATENT DOCUMENTS

| WO | 1997023023 A1 | 6/1997 |
| WO | 2010077856 A1 | 7/2010 |

OTHER PUBLICATIONS

International Search Report and Written Opinion PCT/US2019/021551 dated Jul. 9, 2019, 12 Pgs.

*Primary Examiner* — Jerry Rahll
(74) *Attorney, Agent, or Firm* — Grant A. Gildehaus (57) ABSTRACT An enclosure for providing a local convergence point for a fiber optic network may include an enclosure frame and an end panel defining a plurality of ports. The enclosure may include a feeder compartment to receive through at least one of the ports an optical source cable from the network. The enclosure may include a feeder compartment panel pivotally coupled to the feeder compartment and configured to pivot. The enclosure may also include a feeder splice tray removably coupled to the feeder compartment panel and configured to receive one or more optical fibers from the optical source cable. The feeder splice tray may be configured to communicatively couple at least one optical fiber of the optical source cable to at least one distribution fiber configured to facilitate communication with a destination device configured to receive an optical signal from the network.

24 Claims, 6 Drawing Sheets

ENCLOSURE FOR LOCAL CONVERGENCE POINT FOR FIBER OPTIC COMMUNICATIONS NETWORK

CROSS-REFERENCE TO RELATED APPLICATION

This application claims the benefit of priority of U.S. Provisional Patent Application No. 62/642,385, filed on Mar. 13, 2018, the disclosure of which is fully incorporated herein by reference.

BACKGROUND

This disclosure relates to an enclosure for providing a local convergence point for a fiber optic communications network, and more particularly, to an enclosure including at least one splice tray and for providing a local convergence point for a fiber optic communications network and related methods.

Telecommunication networks often include optical cables for communicating broadband signals from a signal source. For example, a fiber optic communications network may include optical cables capable of transmitting voice signals, data signals, and/or video signals over relatively long distances at high data transmission rates. In some telecommunication networks, intermediate fiber optic cables or the end user, such as a service subscriber, may be connected directly to one or more optical fibers of the telecommunication network. As a result, some telecommunication networks include a large number of distribution points from a distribution optical cable to one or more intermediate fiber optic cables or end users. Such distribution points may provide a communication connection between one or more source optical cables from a signal source, such as a service provider, and many separate distribution optical cables that communicatively connect the one or more source optical cables to each of the intermediate fiber optic cables or end users. As a result, some such connections may become complex, thereby resulting in higher installation times and costs.

Some examples described herein may address one or more of possible drawbacks associated with connecting a source or feeder optical cable with one or more distribution optical cables.

SUMMARY

The present disclosure is generally directed to an enclosure for providing a local convergence point for a fiber optic telecommunications network. In some examples, the enclosure may include an enclosure frame defining a longitudinal axis, and an end panel coupled to the enclosure frame and defining a plurality of ports, where each of the plurality of ports is configured to receive an optical cable including a plurality of optical fibers. The enclosure may in some examples also include a feeder compartment associated with the enclosure frame and configured to receive through at least one of the plurality of ports an optical source cable in communication with a network including at least one optical signal source. In some examples, the enclosure may include a feeder compartment panel pivotally coupled to the feeder compartment and configured to pivot between a first position that at least partially encloses the feeder compartment (e.g., that fully encloses the feeder compartment) and a second position substantially exposing an interior of the feeder compartment. In some examples, the enclosure may include a feeder splice tray removably coupled to the feeder compartment panel and configured to receive at least one optical fiber from the optical source cable in communication with the network including the at least one optical communication source. In some examples, the feeder splice tray may be configured to communicatively couple at least one of the plurality of optical fibers of the optical source cable to at least one distribution fiber configured to facilitate communication with a destination device configured to receive an optical signal from the network. In some examples, the feeder splice tray may be configured such that at least one of the plurality of optical fibers of the optical source cable is communicatively coupled to the at least one distribution fiber in the feeder splice tray remotely from the enclosure.

The present disclosure is also generally directed to an enclosure for providing a local convergence point for a fiber optic communications network, the enclosure including an enclosure frame defining a longitudinal axis. The enclosure may also include an end panel coupled to the enclosure frame and defining a plurality of ports, each of the plurality of ports configured to receive an optical cable including a plurality of optical fibers. The enclosure may also include a distribution splice compartment associated with the enclosure frame and including at least one distribution splice tray configured to be communicatively coupled to an optical source cable in communication with a network including the at least one optical communication source and facilitate communicative coupling with at least one distribution fiber configured to facilitate communication with a destination device configured to receive an optical signal from the network including the at least one optical signal source.

DETAILED DESCRIPTION

Reference will now be made in detail to embodiments, examples of which are illustrated in the accompanying drawings. Whenever possible, the same reference numbers are used throughout the drawings to refer to the same or like parts.

This disclosure is generally directed to an enclosure for providing a local convergence point for a fiber optic communications network. In some examples, the enclosure may include an enclosure frame defining a longitudinal axis, and an end panel coupled to the enclosure frame and defining a plurality of ports, where each of the plurality of ports is configured to receive an optical cable including a plurality of optical fibers. The enclosure may in some examples also include a feeder compartment associated with the enclosure frame and configured to receive through at least one of the plurality of ports an optical source cable in communication with a network including at least one optical signal source. As used herein, "compartment" may refer to a volume that is completely closed, partially closed, selectively closable, or open on at least one side thereof. In some examples, the optical source may be a telecommunications service provider communicating data associated with voice signals, data signals, and/or video signals. In some examples, the enclosure may include a feeder compartment panel pivotally coupled to the feeder compartment and configured to pivot between a first position that at least partially encloses the feeder compartment and a second position substantially exposing an interior of the feeder compartment. In some examples, the enclosure may include a feeder splice tray removably coupled to the feeder compartment panel (e.g., to an interior side of the feeder compartment panel) and configured to receive at least one optical fiber from the optical source cable in communication with the network including the at least one optical communication source. In some examples, the feeder splice tray may be configured to communicatively couple at least one of the plurality of optical fibers of the optical source cable to at least one distribution fiber configured to facilitate communication with a destination device configured to receive an optical signal from the network. In some examples, the destination device may be a device located at the premises of a subscriber to one or more services provided by a telecommunications service provider, and the destination device may be configured to receive an optical signal from the network used by the telecommunications service provider. Some examples of the enclosure may facilitate communicatively coupling (e.g., splicing) of one or more optical fibers of one or more optical source cables to one or more optical distribution fibers configured to be communicatively coupled to one or more devices of one or more end users. By providing the feeder splice tray in the enclosure for the local convergence point rather than in a separate remote housing may result in ease of installation and connection of the optical fibers from the one or more optical source cables and the distribution optical fibers, for example, in a more compact and efficient manner.

In some examples, the feeder splice tray may be configured such that at least one of the plurality of optical fibers of the optical source cable is communicatively coupled in the feeder splice tray remotely from the enclosure to at least one distribution fiber. For example, the feeder splice tray may be separated from the feeder compartment panel, and one or more of the optical fibers of the optical source fibers may be spliced with one or more distribution fibers in the feeder splice tray, for example, using a fusion splicer. This may result in more efficient connection of the optical fibers of the optical source cable and the distribution cables, potentially resulting in ease of connection, reduced time for connection, and/or reduced costs associated with connection. Other methods for splicing the one or more optical fibers is contemplated.

In some examples, the feeder compartment panel may define an overlength storage area configured to receive at least one loop of the optical source cable. The overlength storage area may provide a convenient location for storing extra optical fiber in the enclosure, which may result in an organized and efficient use of space inside the enclosure and/or render installation and connection more efficient. In some examples, the feeder splice tray may be located at a first end of the feeder compartment panel, and the overlength storage area may be located between the feeder splice tray and a second end of the feeder compartment panel. This may provide a convenient place to store extra optical cable. Other locations for the overlength storage area in the feeder compartment are contemplated.

Some examples of the enclosure may also include a distribution compartment associated with the enclosure frame, and at least one adaptor panel associated with the distribution compartment and configured to facilitate communicative coupling between at least one optical fiber of the plurality of optical fibers of the optical source cable and the at least one distribution fiber. In some examples, the feeder compartment and the distribution compartment may be located on opposite sides of the enclosure frame from one another. Some such examples may result in an organized and efficient connection of the optical fibers of the plurality of optical fibers of the optical source cable and one or more of the distribution fibers. In some examples, at least one of an optical splitter, a multiplexer, a wave-division multiplexer, or a patch cable may be associated with the distribution compartment and configured to receive an optical signal from the at least one optical fiber of the plurality of optical fibers of the optical source cable. For example, the optical splitter, the multiplexer, the wave-division multiplexer, and/or the patch cable may be provided at the frame at a location substantially accessible to both the feeder compartment and the distribution compartment, which may result in improved organization and ease of connection of the optical fibers of the source cables and the distribution fibers.

Some examples of the enclosure may also include a distribution splice compartment associated with the enclosure frame. The distribution splice compartment in some examples may include at least one distribution splice tray configured to communicatively couple the at least one distribution fiber (e.g., at least one optical fiber communicatively coupled in the enclosure) and at least one destination fiber configured to be in communication with the destination device configured to receive an optical signal from the network including the at least one optical signal source. In some examples, the enclosure may include a distribution splice compartment panel pivotally coupled to the distribution splice compartment and configured to pivot between a first position adjacent the enclosure frame and a second position substantially exposing a reverse side of the distribution splice compartment panel. In the closed position, the distribution splice compartment panel may discourage or prevent installers from disturbing previously installed distribution optical fibers in the distribution compartment. For example, after the enclosure has been positioned and optical fibers from one or more optical source cables have been communicatively coupled to the enclosure, a service technician from the telecommunications service provider may access the distribution splice compartment to communicatively couple distribution fibers from the distribution compartment to one or more distribution fibers that provide the optical signals to the end user. In some examples, it is not necessary for the service technician to access the distribution fibers of the distribution compartment. Rather, the service technician in some examples may only need to access the one or more distribution splice trays of the distribution splice compartment to communicatively couple the distribution fibers from the distribution compartment to one or more distribution fibers that provide the optical signals to the end user. Thus, the distribution splice compartment panel may serve to discourage the service technician from disturbing the previously installed distribution fibers. This may reduce the likelihood of unintended disconnection of some of the previously installed distribution fibers.

In some examples, the at least one distribution splice tray may be removably coupled to the distribution splice compartment, such that at least one distribution fiber is communicatively coupled in the distribution splice tray remotely from the enclosure to at least one destination fiber configured to facilitate communication with a destination device configured to receive an optical signal from the network including the at least one optical signal source (e.g., from the telecommunications service provider). For example, the one or more distribution splice trays may be separated from the distribution splice compartment panel, and one or more of the previously installed optical distribution fibers may be spliced with one or more distribution fibers of the end user, for example, using a fusion splicer. This may result in more efficient connection of the optical fibers, potentially resulting in ease of connection, reduced time for connection, and/or reduced costs associated with connection. Other methods for splicing the one or more optical fibers is contemplated.

In some examples, the at least one distribution splice tray may be located at a first end of the distribution splice compartment remote from the plurality of ports, and the distribution splice compartment may define a distribution overlength storage area configured to receive at least one loop of distribution fibers. The distribution overlength storage area may provide a convenient location for storing extra optical fiber in the enclosure, which may result in an organized and efficient use of space inside the enclosure and/or render installation and connection more efficient. In some examples, the distribution overlength storage area is located between the first end of the distribution splice compartment and a second end of the distribution splice compartment located adjacent the plurality of ports. The location of the distribution overlength storage area may provide a convenient place to store extra optical cable. Other locations for the distribution overlength storage area in the distribution splice compartment are contemplated. In some examples, the enclosure may include a distribution splice compartment overlength panel pivotally coupled to the distribution splice compartment and configured to pivot between a first position covering the distribution overlength storage area and a second position substantially exposing the distribution overlength storage area. In some such examples, the distribution splice compartment overlength panel may be convex to provide more space for storage of the extra optical fiber.

Figure 1:
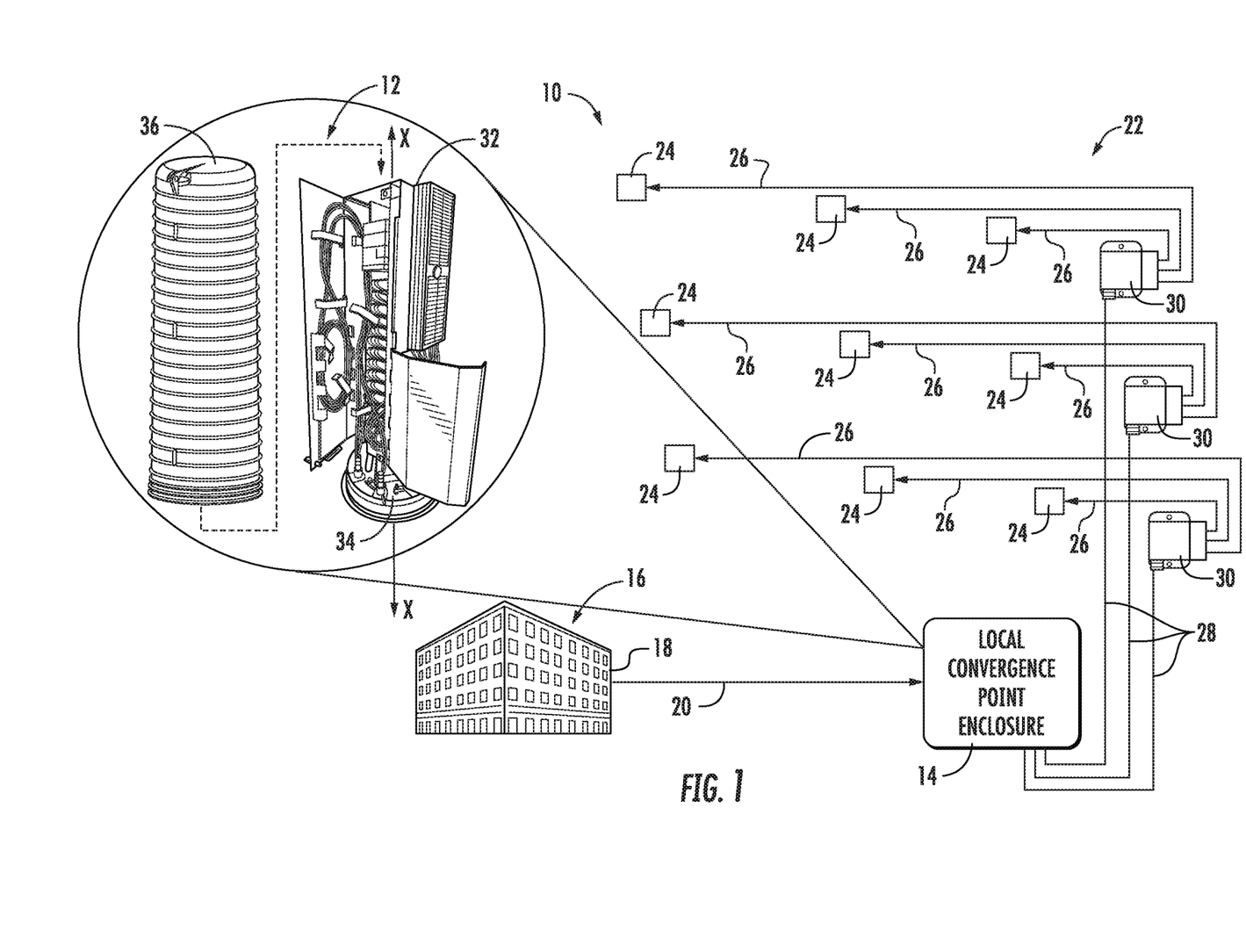
FIG. 1 is a block diagram showing an example fiber optic telecommunications network and a schematic perspective view of an example enclosure for providing a local convergence point for the example network.

FIG. 1 is a block diagram showing an example fiber optic telecommunications network 10 (e.g., an optical network) and a schematic perspective view of an example enclosure 12 for providing a local convergence point 14 for the example network 10. The example network 10 shown in FIG. 1 includes at least one optical signal source 16, which may be, for example, a transmission facility 18 of a telecommunications service provider. As shown in FIG. 1, the optical signal source 16 may provide optical telecommunication signals to the network 10 via, for example, one or more network-side fiber optic cables 20, which may communicate the optical telecommunication signals to, for example, a multiple-dwelling unit (MDU) 22 (e.g., an apartment building or condominium building), which may include a plurality of user end points 24, such as, for example, an adapter in a wall outlet, a floor panel, behind a ceiling tile, or any similar structure, such that the user (e.g., a subscriber of services provided by the telecommunications service provider) may optically connect to, for example, one or more user-side optical fibers 26. In some examples, the network-side fiber optic cables 20 may communicate the optical telecommunication signals to, for example, an office building including one or more tenants, or a neighborhood of single family dwellings, for example, in a fiber-to-the-home (FTTH), fiber-to-the-business (FTTB), or fiber-to-the-desk (FTTD) manner. In the example shown, the network-side fiber optic cables 20 may each be feeder cables and may include one or more optical fibers for transmitting data in the form of optical telecommunication signals.

As shown in FIG. 1, the network-side fiber optic cables 20 may be communicatively coupled to the local convergence point 14, which, in turn, may be communicatively coupled to one or more user-side fiber optic cables 28, which may be distribution cables. In some examples, the user-side fiber optic cables 28 may be communicatively coupled to respective fiber distribution terminals (FDTs) 30, which may be communicatively coupled to more than one of the user-side optical fibers 26, which, in turn, may be communicatively coupled to respective user end points 24. In some examples, the FDTs 30 may be configured to receive the user-side optical cables 28 and provide the individual user-side optical fibers 26 to the respective user end points 24. In some examples, the user-side optical fibers 26 may include optical fibers from the user-side fiber optic cables 28 and may be communicatively coupled directly to the respective user end points 24, for example, without being communicatively coupled to an FDT. In some examples, the user end points 24 may be communicatively coupled to one or more destination devices configured to receive the optical telecommunication signals from the network 10. For example, the destination devices may include any devices configured to receive data from a network, such as, for example, the Internet or other networks, including, for example, computers, hand-held computers such as tablets and smart phones, televisions, displays, smart appliances, etc.

In some examples, the local convergence point 14 may be configured to receive one or more of the network-side fiber optic cables 20, such as feeder cables, and communicatively couple one or more of the network-side fiber optic cables 20 to one or more user-side fiber optic cables 28 and/or one or more user-side optical fibers 26, such as distribution cables and/or distribution fibers, respectively. In the example shown in FIG. 1, the local convergence point 14 may include the enclosure 12, which is configured to provide the local convergence point 14 for the example network 10. As shown in FIG. 1, the example local convergence point 14 is configured to communicatively couple optical fibers of the one or more network-side fiber optic cables 20 from a telecommunications service provider with the user-side optical fibers 26 that are directly communicatively coupled to the user end points 24 (e.g., of subscribers of the telecommunications service). In some examples, optical fibers of the network-side fiber optic cables 20 are communicatively connected to optical fibers of one or more user-side fiber optic cables 28 that are routed directly to a business or dwelling of a user of the telecommunications service. In some examples, optical fibers of the network-side fiber optic cables 20 may be communicatively coupled to optical fibers of an intermediate fiber optic cable that is routed from the local convergence point 14 to yet another local convergence point along the network to serve as a further network-side cable (e.g., another feeder cable) for communicative coupling to one or more additional user-side cables. For example, the user-side fiber optic cables 28 (e.g., distribution cables) may serve either as drop cables routed directly to user end points 24 associated with end users (e.g., subscribers), or as branch cables routed to other local convergence points.

As shown in FIG. 1, the enclosure 12 facilitates optical fibers of the network-side fiber optic cables 20 to be communicatively coupled with two or more optical fibers of the user-side fiber optic cables 28 at the local convergence point 14 in the network 10. In some examples, the local convergence point 14 provides a location along the network 10 to provide a service technician with access to optical connections between the network-side fiber optic cables 20 (e.g., feeder cables) and the user-side fiber optic cables 28 (e.g., distribution cables). For example, the network 10 may be configured with a line of enclosures 12 along the network 10 that interconnect optical fibers of the network-side fiber optic cables 20 with optical fibers of user-side fiber optic cables 28, which provide telecommunications services to homes and businesses, or with optical fibers of branch cables leading to other enclosures 12, which provide other local convergence points along the network 10. In some examples, the enclosure 12 may be buried below-ground, installed in an aerial location, for example, mounted on a telephone pole or hung from an aerial cable strand, or disposed in a larger enclosure, such as, for example, on an above-ground pedestal. The example enclosure 12 may provide a convenient access point in the network 10 for a service technician to initially install and/or subsequently reconfigure the optical fiber connections between the network-side fiber optic cables 20 and the user-side fiber optic cables 28.

The network-side fiber optic cable 20 may include in some examples one or more flexible buffer tubes, each containing one or more optical fibers connected to communications transmission equipment from the transmission facility 18 (e.g., of the telecommunications service provider). The user-side fiber optic cable 28 may include in some examples one or more flexible buffer tubes, and the one or more flexible buffer tubes may include one or more drop cables, for example, each containing at least one optical fiber communicatively coupled to, for example, communications equipment at a user's premises, such as a home or business. The buffer tubes of the network-side fiber optic cables 20 and/or the buffer tubes of the user-side fiber optic cables 28 may contain any type, or types, of optical fibers, such as, for example, tight-buffered optical fibers, loose-buffered optical fibers, and ribbon fiber. The optical fibers may include all types of optical fibers, such as, for example, coated optical fibers, individual uncoated optical fibers, tight-buffered optical fibers, loose-buffered optical fibers, optical fibers in the form of a multi-fiber ribbon, and/or any other known form of a light transmitting fiber medium. The optical fibers may have various sizes including, for example, diameters of 900 microns, 2 millimeters, and 3 millimeters.

As shown in FIG. 1, the example enclosure 12 includes an enclosure frame 32, an end panel 34 coupled to one end of the enclosure frame 32, and a dome-shaped housing 36. In the example shown, the housing 36 fits over the enclosure frame 32 and may be secured to the end panel 34 to protect optical fiber connections within the enclosure 12 from adverse environmental effects, such as, for example, dirt, dust, and insect and rodent infestation, and/or to provide a relatively fluid-resistant seal (e.g., a fluid-tight seal) between the housing 36 and the end panel 34. In some examples, the enclosure frame 32 may be formed from a relatively lightweight, structurally rigid material, such as, for example, metal (e.g., aluminum), plastic, thermoplastic, composite material (e.g., including fiber and/or resin), and/or combinations thereof. In some examples, the end panel 34 and/or the housing 36 may be formed of a relatively lightweight, structurally rigid material, such as, for example, plastic, thermoplastic, composite material, and/or combinations thereof.

As shown, the example enclosure frame 32 is generally elongate and defines a longitudinal axis X. The enclosure frame 32 defines a plurality of mounting surfaces for receiving fiber storage, fiber coupling, fiber management, and fiber connecting components of the enclosure 12.

Figure 2:
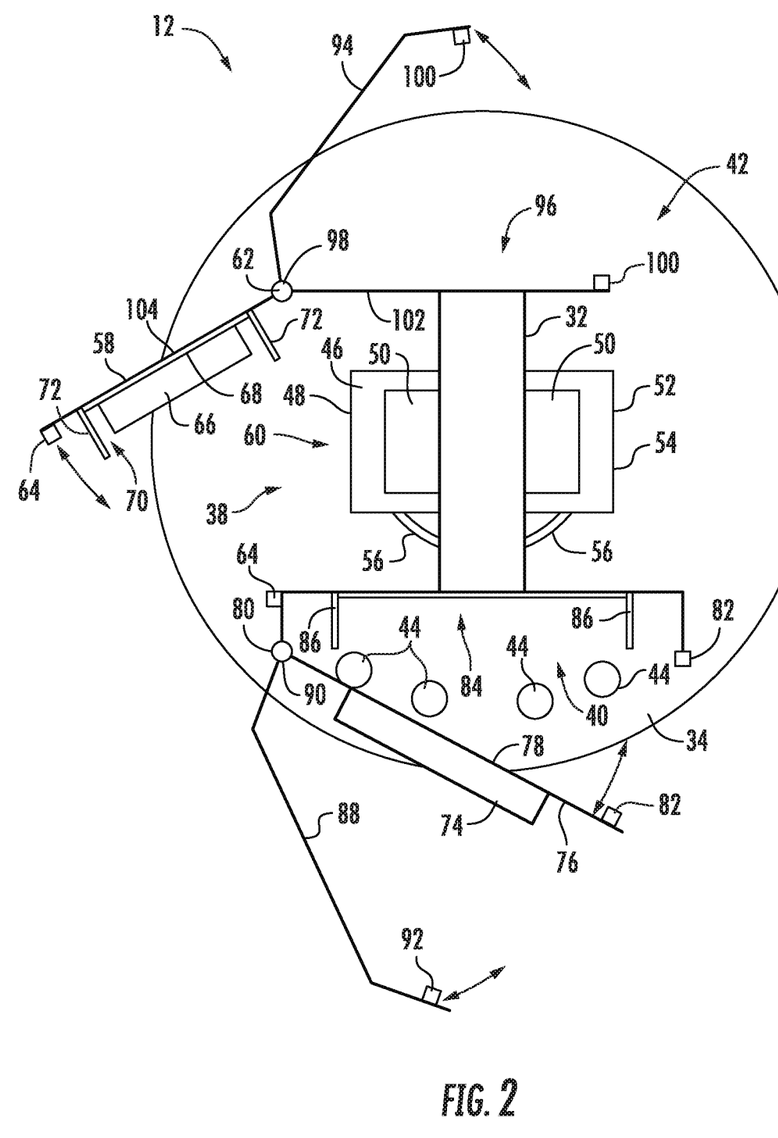
FIG. 2 is a schematic top view of an example enclosure for providing a local convergence point for an example fiber optic telecommunications network.

FIG. 2 is a schematic top view of an example enclosure 12 for providing a local convergence point for an example fiber optic telecommunications network. As shown in FIG. 2, the example enclosure frame 32 at least partially defines a feeder compartment 38, a distribution splice compartment 40, and a distribution compartment 42. In the example shown, the feeder compartment 38 and the distribution compartment 42 are located on opposite sides of the enclosure frame 32. In some examples, the feeder compartment 38, distribution splice compartment 40, and distribution compartment 42 may be arranged differently relative to one another than shown in FIG. 2. In some examples, the end panel 34 may define one or more ports 44 configured to receive, for example, one or more network-side fiber optic cables 20 (e.g., feeder fiber optic cables), one or more user-side optical fibers 26 (e.g., distribution optical fibers), and/or one or more user-side fiber optic cables 28 (e.g., distribution fiber optic cables). For example, the feeder compartment 38 may be configured to receive one or more network-side fiber optic cables 20 through one of more of the ports 44. In some examples, one or more optical fibers from the one or more network-side fiber optic cables 20 may be communicatively coupled to the enclosure 12 in the feeder compartment 38 to provide the input to the local convergence point 14, for example, as described herein. In some examples, the distribution splice compartment 40 may be configured to receive one or more user-side optical fibers 26 and/or one or more user-side fiber optic cables 28 via one or more of the ports 44. In some such examples, the one or more user-side optical fibers 26 and/or the one or more user-side fiber optic cables 28 may enter enclosure 12 via the one or more ports 44 and extend from inside the enclosure 12 to one or more of the user ends points 24 (e.g., one or more subscribers) (see FIG. 1). In such examples, the one or more optical fibers from the one or more user-side fiber optic cables 28 and/or the user-side optical fibers 26 may be communicatively coupled to the enclosure 12 in the distribution splice compartment 40 to provide the output from the local convergence point 14, for example, as described herein. Although the example shown in FIG. 2 includes four ports 44, fewer or more ports 44 are contemplated.

In the example shown in FIG. 2, the enclosure 12 also includes a feeder adaptor panel 46 including one or more feeder adaptors 48 associated with (e.g., coupled to) the feeder compartment 38 and configured to provide one or more communicative connection points for receiving one or more feeder optical fibers communicatively coupled to one or more optical fibers of the one or more network-side fiber optic cables 20. The example enclosure 12 also includes a module 50 communicatively coupled to the feeder adaptor panel 46 and to one or more distribution adaptor panels 52 including one or more distribution adaptors 54 configured to provide one or more communicative connection points associated with (e.g., coupled to) the distribution compartment 42. The module 50 may include one or more of a splitter module, a multiplexer, or a wave-division multiplexer, for example, configured to split optical signals from the one or more feeder optical fibers into multiple signals and/or multiple channels. In some examples, the enclosure 12 may include a patch cable 56 communicatively coupled to the feeder adaptor panel 46 and communicatively coupled to the distribution adaptor panel 52 to provide a direct communicative connection between the feeder adaptor panel 46 and a specific one of the distribution adaptors 54.

In the example shown in FIG. 2, the enclosure 12 also includes a feeder compartment panel 58 pivotally coupled to the feeder compartment 38 and configured to pivot between a first position that at least partially encloses the feeder compartment 38 and a second position substantially exposing an interior 60 of the feeder compartment 38. For example, a hinge 62 may couple an edge of the feeder compartment panel 38 to the enclosure frame 32, so that the feeder compartment panel 58 may pivot between the first and second positions. In some examples, the feeder compartment panel 58 and the enclosure frame 32 may each include complimentary latch mechanisms 64 to selectively secure the feeder compartment panel 58 in the first position (e.g., the closed position). This may help contain the equipment, optical fibers, and/or fiber optic cables within the feeder compartment 58 of the enclosure 12, for example, so that the housing 36 may be more easily placed over top of the enclosure 12 and secured to the end panel 34.

Figure 3A:
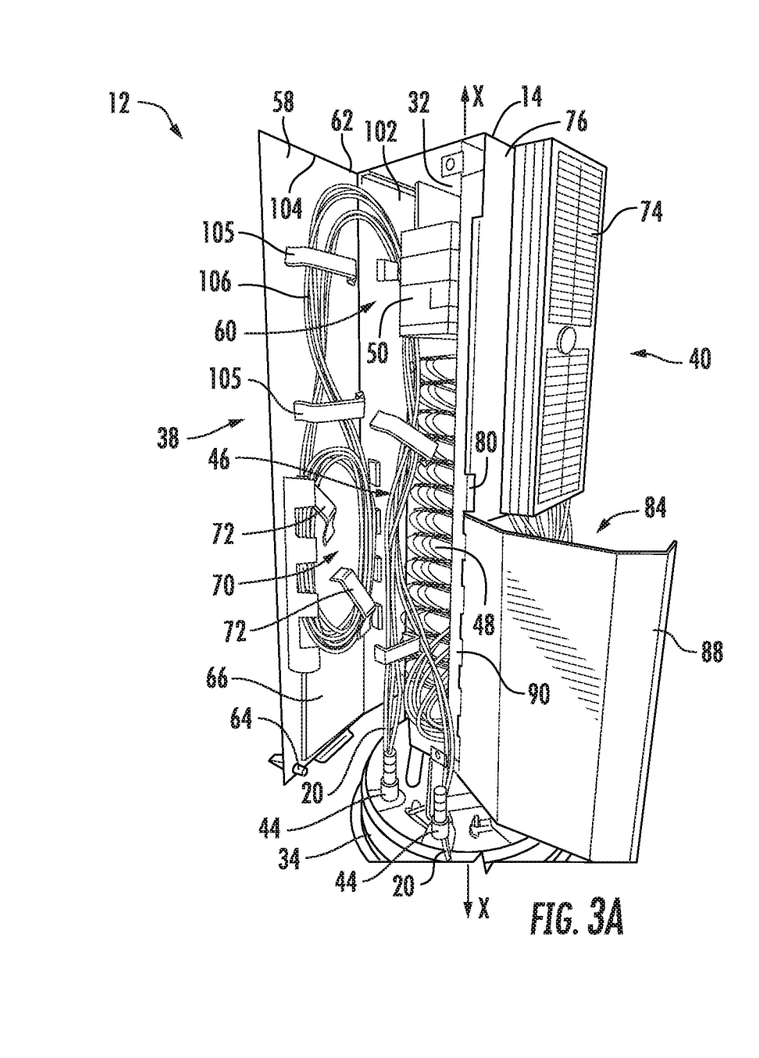
FIG. 3A is a schematic perspective view of an example feeder compartment of an example enclosure.
Figure 3B:
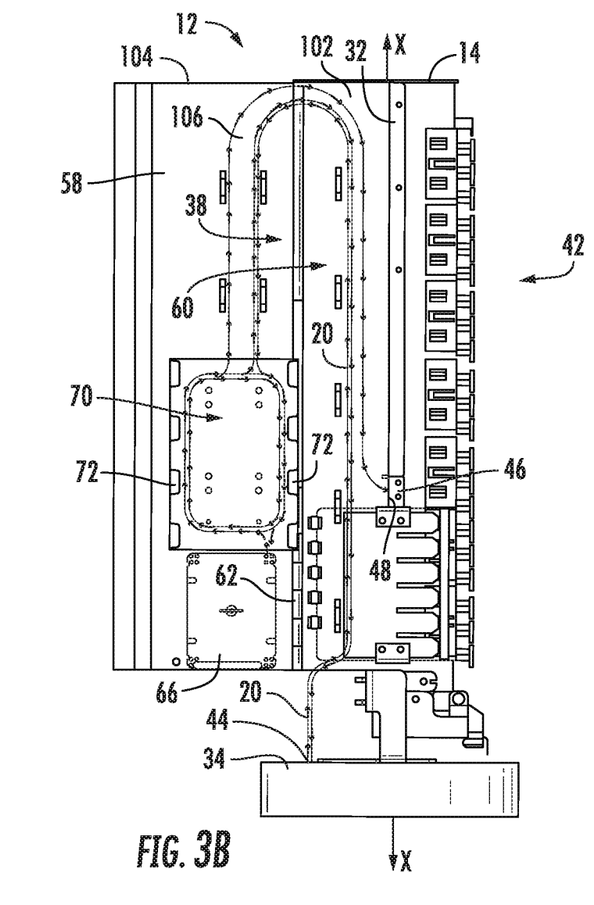
FIG. 3B is a schematic side section view of an example feeder compartment of the example enclosure shown in FIG. 3A with an example feeder compartment panel in an open position exposing an interior side of the feeder compartment panel.

As shown in FIG. 2, a feeder splice tray 66 may be coupled to the feeder compartment panel 58 (e.g., to an interior side 68 of the feeder compartment panel 58) and configured to receive at least one optical fiber from the network-side fiber optic cable 20 (e.g., an optical source cable) in communication with the network 10 (see also FIGS. 3A and 3B). Providing the feeder splice tray 66 in the enclosure 12 rather than in a separate remote housing may result in ease of installation and connection of the optical fibers from the one or more network-side fiber optic cables 20 and the user-side optical fibers 26 and/or the user-side fiber optic cables 28, for example, in a more compact and efficient manner. In some examples, the feeder splice tray 66 may be removably coupled to the interior side 68 of the feeder compartment panel 58 and configured to receive at least one optical fiber from the network-side fiber optic cable 20 (e.g., an optical source cable) in communication with the network 10 (see also FIGS. 3A and 3B). In some examples, the feeder splice tray 66 may be configured such that at least one of the plurality of optical fibers of the network-side fiber optic cable may be communicatively coupled in the feeder splice tray 66 remotely from the enclosure 12 to at least one user-side optical fiber 26 and/or at least one optical fiber of the user-side fiber optic cable 28. For example, the feeder splice tray 66 may be configured to facilitate splicing using a fusion splicer. Some such examples may result in more efficient connection of the optical fibers of the network-side fiber optic cables 20 and the user-side optical fibers 26 and/or the user-side fiber optic cables 28, potentially resulting in ease of connection, reduced time for connection, and/or reduced costs associated with connection. Other methods for splicing the one or more optical fibers is contemplated.

In the example shown, the feeder compartment panel 58 defines an overlength storage area 70 configured to receive at least one loop of the network-side fiber optic cable 20 (see also FIGS. 3A and 3B). In some examples, the feeder splice tray 66 is located at a first end of the feeder compartment panel 58, and the overlength storage area 70 is located between the feeder splice tray 66 and a second end of the feeder compartment panel 58, for example, as shown in FIGS. 3A and 3B. In some examples, the overlength storage area 70 may provide a convenient location for storing extra optical fiber in the enclosure 12, which may result in an organized and efficient use of space inside the enclosure 12 and/or render installation and connection more efficient. In some examples, the enclosure 12 may include one or more cable clips 72 on the interior side 68 of the feeder compartment panel 58 configured to retain one or more cables in the overlength storage area 70.

In some examples, for example as shown in FIG. 2, the distribution splice compartment 40 includes at least one distribution splice tray 74 configured to communicatively couple at least one optical fiber in the enclosure 12 with at least one user-end optical fiber 26 and/or user-end fiber optic cable 28 configured to be in communication with one or more of the user end points 24 (see FIG. 1) and a destination device configured to receive an optical signal from the network 10. In some examples, the enclosure 12 may include a distribution splice compartment panel 76 pivotally coupled to the distribution splice compartment 40 and configured to pivot between a first position adjacent the enclosure frame 32 and a second position substantially exposing a reverse side 78 of the distribution splice compartment panel 76. For example, a hinge 80 may couple an edge of the distribution splice compartment panel 76 to the enclosure frame 32, so that the distribution splice compartment panel 76 may pivot between the first and second positions. In some examples, the distribution splice compartment panel 76 and the enclosure frame 32 may each include complimentary latch mechanisms 82 to selectively secure the distribution splice compartment panel 76 in the first position (e.g., the closed position). This may help contain the equipment, optical fibers, and/or fiber optic cables within the distribution splice compartment 40 of the enclosure 12, for example, so that the housing 36 may be more easily placed over top of the enclosure 12 and secured to the end panel 34.

In some examples, the one or more distribution splice trays 74 may be removably coupled to the distribution splice compartment 40 (e.g., to the distribution splice compartment panel 76), such that at least one of the user-side optical fibers 26 and/or the user-side fiber optic cables 28 may be communicatively coupled in the distribution splice tray 74 remotely from the enclosure 12 to one or more optical fibers and/or one or more fiber optic cables configured to be in communication with one or more of the user end points 24 (see FIG. 1) and a destination device configured to receive an optical signal from the network 10. In some examples, the one or more distribution splice trays 74 may be located at a first end of the distribution splice compartment 40 remote from the plurality of ports 44, and the distribution splice compartment 40 may define a distribution overlength storage area 84 configured to receive at least one loop of user-side optical fibers 26 and/or user-side fiber optic cables 28. In some examples, the distribution overlength storage area 84 may be located between the first end of the distribution splice compartment 40 and a second end of the distribution splice compartment 40 located adjacent the plurality of ports 44. In some examples, the distribution overlength storage area 84 may provide a convenient location for storing extra optical fiber in the enclosure 12, which may result in an organized and efficient use of space inside the enclosure 12 and/or render installation and connection more efficient. In some examples, the enclosure 12 may include one or more cable clips 86 configured to retain one or more optical fibers and/or fiber optic cables in the distribution overlength storage area 84.

Figure 5A:
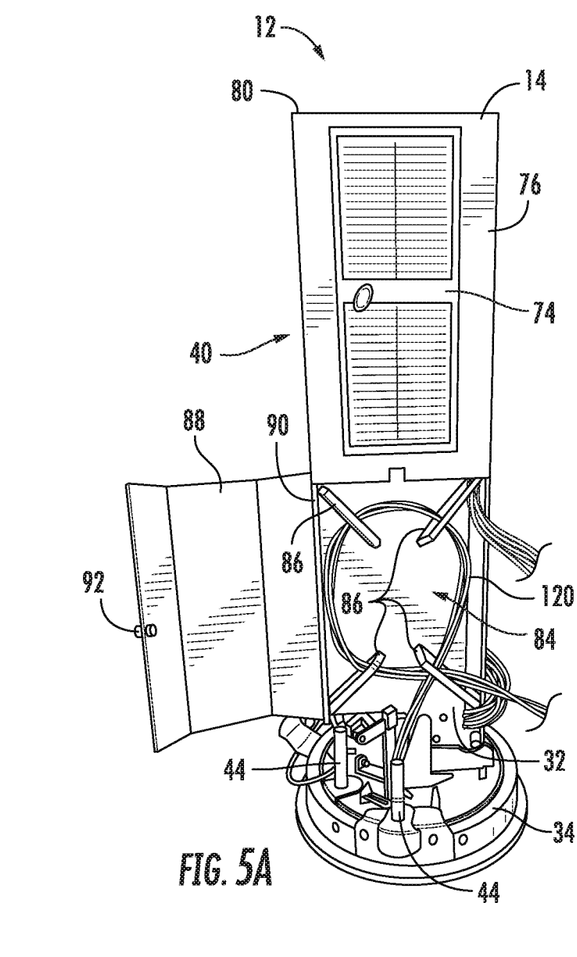
FIG. 5A is a schematic perspective view of an example distribution splice compartment of an example enclosure with an example distribution slice compartment panel in a closed position and an example distribution splice compartment overlength panel in an open position.
Figure 5B:
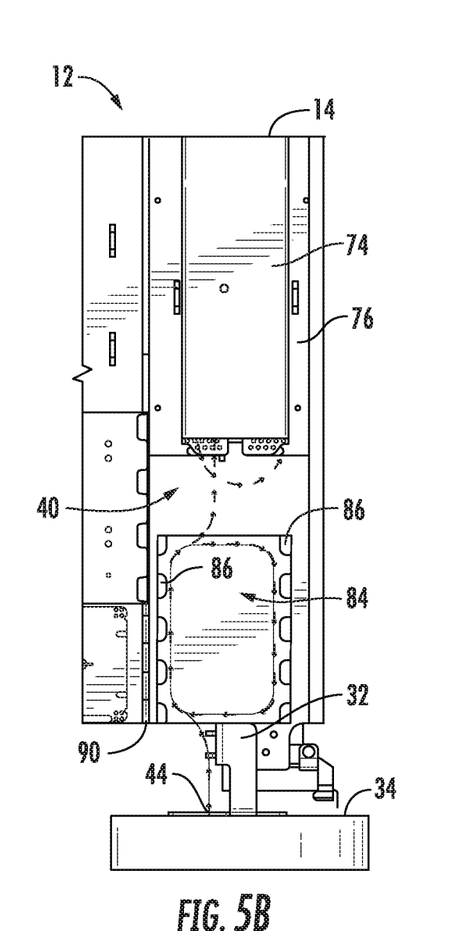
FIG. 5B is a schematic side section view of the example distribution splice compartment shown in FIG. 5A with the example distribution slice compartment panel in a closed position and the example distribution splice compartment overlength panel removed to expose an example overlength storage area.

As shown in FIG. 2, some examples may include a distribution splice compartment overlength panel 88 pivotally coupled to the distribution splice compartment 40 and configured to pivot between a first position covering the distribution overlength storage area 84 and a second position substantially exposing the distribution overlength storage area 84 (see also FIGS. 5A and 5B). For example, a hinge 90 may couple an edge of the distribution splice compartment overlength panel 88 to the enclosure frame 32, so that the distribution splice compartment overlength panel 88 may pivot between the first and second positions. In some examples, the distribution splice compartment overlength panel 88 and the enclosure frame 32 may each include complimentary latch mechanisms 92 to selectively secure the distribution splice overlength compartment panel 88 in the first position (e.g., the closed position). This may help contain the equipment, optical fibers, and/or fiber optic cables within the distribution splice compartment 40 of the enclosure 12, for example, so that the housing 36 may be more easily placed over top of the enclosure 12 and secured to the end panel 34.

Figure 4A:
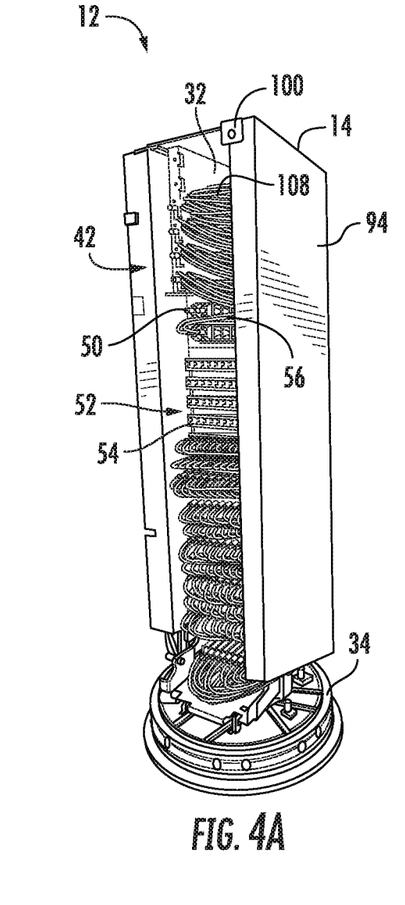
FIG. 4A is a schematic perspective view from a first viewpoint of an example distribution compartment of an example enclosure.
Figure 4B:
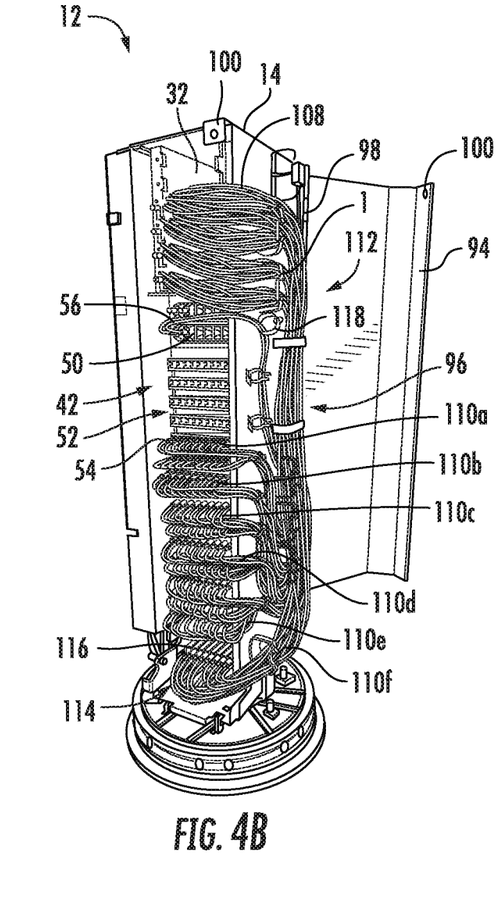
FIG. 4B is a schematic perspective view from a second viewpoint of the example distribution compartment shown in FIG. 4A.
Figure 4C:
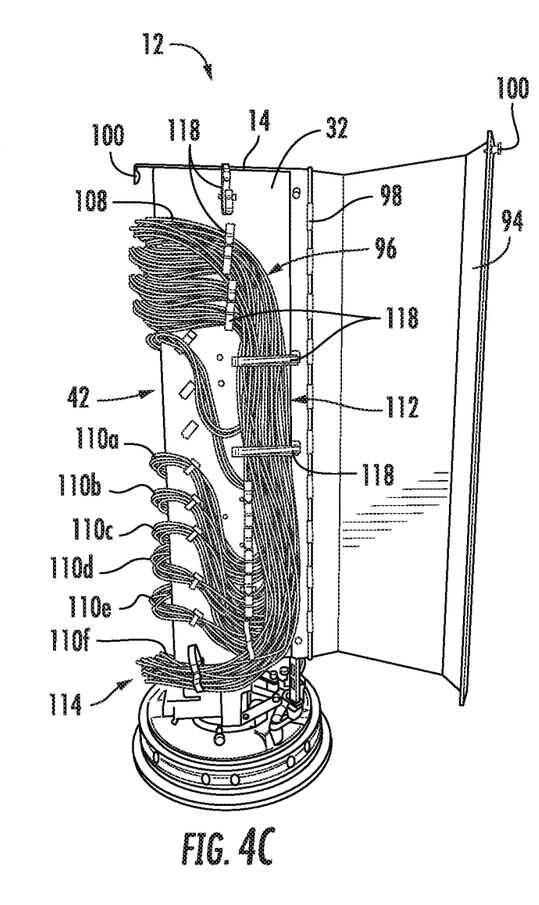
FIG. 4C is a schematic perspective view from a third viewpoint of the example distribution compartment shown in FIGS. 4A and 4B.

As shown in FIG. 2, some examples of the enclosure 12 may include a distribution compartment panel 94 pivotally coupled to the distribution compartment 42 and configured to pivot between a first position covering at least a portion 96 of the distribution compartment 42 and a second position substantially exposing the portion 96 of the distribution compartment 42 (see also FIGS. 4A-4C). For example, a hinge 98 may couple an edge of the distribution compartment panel 94 to the enclosure frame 32, so that the distribution compartment panel 94 may pivot between the first and second positions. In some examples, the distribution compartment panel 94 and the enclosure frame 32 may each include complimentary latch mechanisms 100 to selectively secure the distribution compartment panel 94 in the first position (e.g., the closed position). This may help contain the equipment, optical fibers, and/or fiber optic cables within the distribution compartment 42 of the enclosure 12, for example, so that the housing 36 may be more easily placed over top of the enclosure 12 and secured to the end panel 34.

FIG. 3A is a schematic perspective view of an example feeder compartment 38 of an example enclosure 12, and FIG. 3B is a schematic side section view of the example feeder compartment 12 with an example feeder compartment panel 58 in an open position exposing an interior side 68 of the feeder compartment panel 58. As shown in FIGS. 3A and 3B, an example network-side fiber optic cable 20 enters the feeder compartment 38 of the enclosure 12 at a first one of the ports 44 in the end panel 34. In the example shown, the network-side fiber optic cable 20 may be arranged to travel up an interior side 102 of the feeder compartment 38 and loop along an upper edge 104 of the feeder compartment panel 46 and back down the interior side 68 of the feeder compartment panel 58 to the overlength storage area 70. The interior of the feeder compartment 38 may be provided with a number of cable clips 105 configured to retain the network-side fiber optic cable 20 in the desired locations as it loops through the feeder compartment 38. In the example shown, the network-side fiber optic cable 20 is able to maintain this example arrangement even when the feeder compartment panel 58 is pivoted to the second (closed) position. As shown, an extra length of the network-side fiber optic cable 20 may be stored in the overlength storage area 70, for example, in a looped form. This example arrangement may provide an ability to store a relatively large amount of extra cable length in an organized way, so that a service technician may be provided with a helpful amount of slack in the network-side fiber optic cable 20 to render it relatively easier to work with the network-side fiber optic cable 20 when servicing and/or communicatively coupling the network-side fiber optic cable 20 to the enclosure 12.

In some examples, at least some optical fibers from the network-side fiber optic cable 20 may be separated from the remainder of the optical fibers of the network-side fiber optic cable 20 and communicatively coupled to the feeder splice tray 66. In some examples, the feeder splice tray 66 may be configured to be selectively removed or separated from the feeder compartment panel 58 to render it relatively easier to splice the optical fibers into the feeder splice tray, for example, using a fusion splicer or any other similar splicing device. Once the optical fibers from the network-side fiber optic cable 20 have been spliced into the feeder splice tray 66, the feeder splice tray 66 may be recoupled to the interior side 68 of the feeder compartment panel 58. The remainder of the network-side fiber optic cable 20 may loop back to the upper edge 104 of the feeder compartment panel 58 and back down the interior side 102 of the feeder compartment 38 and exit the enclosure 12 through one of the ports 44, for example, as shown in FIG. 3B.

In the example shown in FIG. 3A, network-side (e.g., feeder side) optical fibers 106 are communicatively coupled to respective feeder adaptors 48 of the feeder adaptor panel 46 (see also FIGS. 4A-4C). The network-side optical fibers 106 communicatively coupled to the feeder adaptor panel 46 are in communication with the module 50 and/or the patch cable 56, which is communicatively coupled to the one or more distribution adaptor panels 52 in the distribution compartment 42 (see FIGS. 4A-4C) and configured to provide one or more communicative connection points associated with (e.g., coupled to) the distribution compartment 42. As noted herein, the module 50 may include one or more of a splitter module, a multiplexer, or a wave-division multiplexer, for example, configured to split optical signals from the one or more feeder optical fibers into multiple signals and/or multiple channels. In some examples, the patch cable 56 may be provided and may be configured to communicatively couple the feeder adaptor panel 46 to the distribution adaptor panel 52 to provide a direct communicative connection between the feeder adaptor panel 46 and a specific one or the distribution adaptors 54 of the distribution adaptor panel 52.

Referring to FIGS. 4A and 4B, in the example shown, the module 50 and/or the patch cable 56 are accessible from the distribution compartment 42. Optical fibers 108 in the distribution compartment 42 communicatively coupled to the module 50 and/or the patch cable 56 may be organized into one or more fiber legs 110a-110f, and the one or more fiber legs 110a-110f may be arranged and travel down a collection area 112 (see FIG. 4C) and, in some examples, one or more of the fiber legs 110a-110f (e.g., fiber leg 110θ) may be secured to a parking area 114, which may include one or more parking adaptors 116 configured to receive remote ends of the optical fibers 108 of the fiber leg(s). Cable clips 118 may be provided to facilitate organization and arrangement of the optical fibers 108 and/or the fiber legs 110-110f. In some examples, the parking adaptors 116 may serve only to secure the remote ends of the optical fibers 108 of the fiber leg(s), for example, without communicatively coupling those optical fibers 108 to the user-side optical fibers 26 and/or the user-side fiber optic cable 28. As shown, one or more one or more of the fiber legs 110a-110e may be arranged to travel down the collection area 112 and be communicatively coupled to respective distribution adaptors 54 of the distribution adaptor panel 52, such that the optical fibers of the fiber legs 110a-110e are communicatively coupled to the user-side optical fibers 26 and/or the user-side fiber optic cable 28, as desired. In some examples, the patch cable 56 may be coupled to the feeder adaptor panel 46 and the distribution adaptor panel 52 to provide a direct communicative connection to a specific distribution adaptor 54 of the distribution adaptor panel 52. In some examples, for example as shown in FIG. 4C, optical fibers from the network-side fiber optic cable 20 are coupled to the feeder adaptors 48, and the module 50 and/or the patch cable 56 is/are communicatively coupled to the feeder adaptors 48. The module 50 and/or the patch cable 56 is/are also communicatively coupled to the distribution adaptors 54 and/or the parking area 114.

Some examples may result in a layered routing arrangement, for example, as shown in FIG. 4C. This may result in the bulk of the fiber legs 110a-110f being relatively well separated from the feeder adaptor panel 46 and the distribution adaptor panel 52. In some examples, the fiber legs 110a-110f may more easily be separated into subgroups by a service technician.

FIG. 5A is a schematic perspective view of an example distribution splice compartment 40 of an example enclosure 12 with an example distribution splice compartment panel 76 in a closed position and an example distribution splice compartment overlength panel 88 in an open position. FIG. 5B is a schematic side section view of the example distribution splice compartment 40 shown in FIG. 5A with the example distribution splice compartment panel 76 in a closed position and the example distribution splice compartment overlength panel 88 omitted from the view to expose the example distribution overlength storage area 84.

Figure 6A:
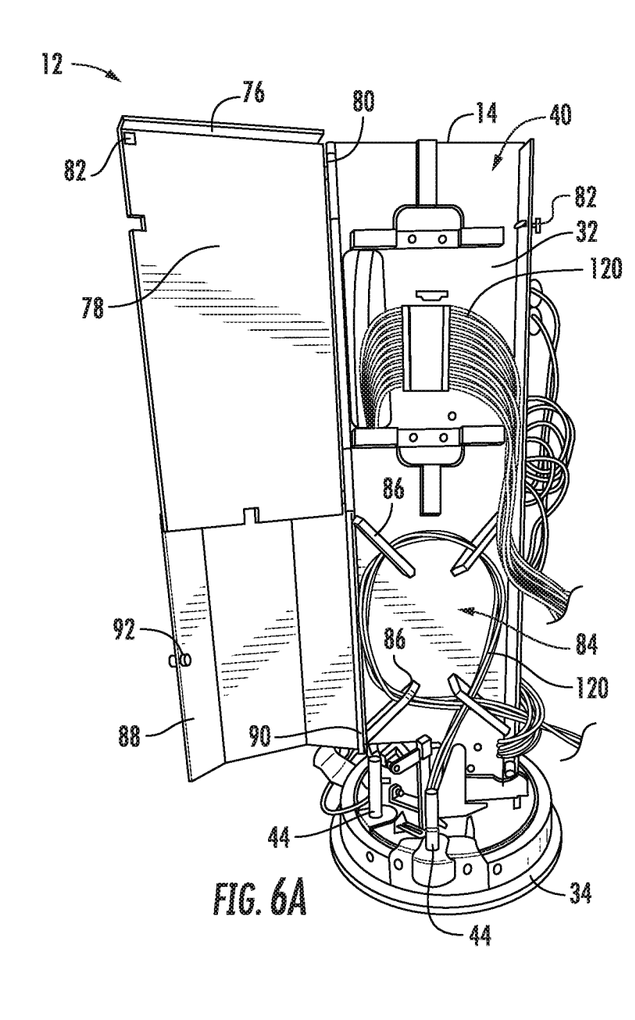
FIG. 6A is a schematic perspective view of an example distribution splice compartment of an example enclosure with an example distribution splice compartment panel in an open position and an example distribution splice compartment overlength panel in an open position.
Figure 6B:
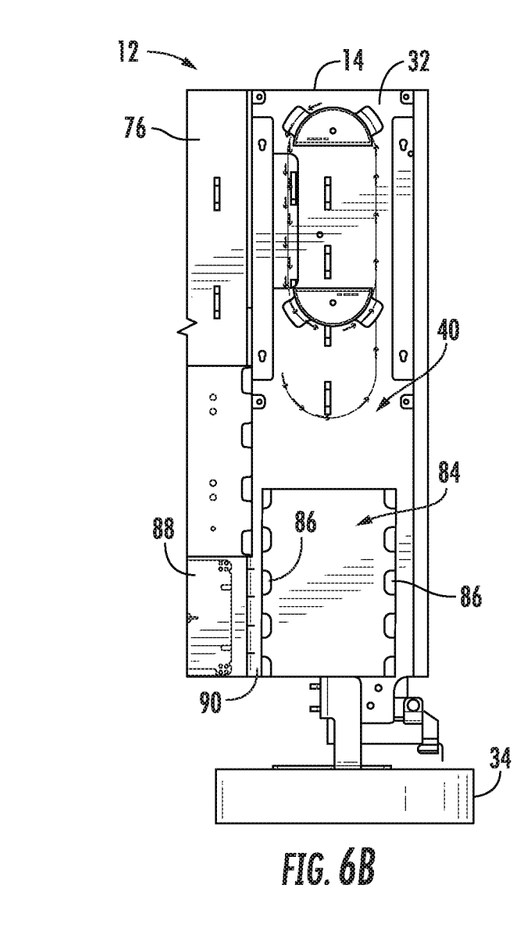
FIG. 6B is a schematic side section view of the example distribution splice compartment shown in FIG. 6A with the example distribution splice compartment panel removed to expose the enclosure behind the distribution splice compartment panel and the example distribution splice compartment overlength panel removed to expose an example overlength storage area.

Referring to FIGS. 5A and 5B, optical fibers 120 communicatively coupled to the distribution adaptors 54 (see FIGS. 4A-4C) are routed from the distribution compartment 42 into the distribution splice compartment 40, where they may be communicatively coupled to the user-side optical fibers 26 and/or to one or more user-side fiber optic cables 28 (see also FIG. 6A). In the example shown, the distribution splice compartment 40 includes the one or more distribution splice trays 74 (see FIGS. 5A and 5B), and the optical fibers 120 from the distribution compartment 42 may be communicatively coupled to the user-side optical fibers 26 and/or to one or more user-side fiber optic cables 28 in the one or more distribution splice trays 74. In some examples, the one or more distribution splice trays 74 may be selectively separated from the distribution splice compartment panel 76, and the one or more of the optical fibers 120 may be remotely spliced with the user-side optical fibers 26 and/or to optical fibers of the one or more user-side fiber optic cables 28, for example, using a fusion splicing device. Other ways of splicing the fibers are contemplated. The user-side optical fibers 26 and/or to optical fibers of the one or more user-side fiber optic cables 28 may exit the enclosure 12 at one or more of the ports 44 in the end panel 34 and extend to the user end points 24 (see FIG. 1) to provide telecommunication service to users (e.g., subscribers).

As shown in FIGS. 5A, 5B, 6A, and 6B, the example distribution splice compartment 40 includes a distribution overlength storage area 84. The distribution overlength storage area 84 may be configured to receive at least one loop of the optical fibers 120. In some examples, the distribution overlength storage area 84 may be located between the first end of the distribution splice compartment 40 and a second end of the distribution splice compartment 40 located adjacent the plurality of ports 44. The distribution overlength storage area 84 may provide a convenient location for storing extra length of optical fiber in the enclosure 12, which may result in an organized and efficient use of space inside the enclosure 12 and/or render installation and connection more efficient. Cable clips 86 may be provided to retain extra length of the optical fibers 120 in the distribution overlength storage area 84. As noted herein, some examples may include a distribution splice compartment overlength panel 88 pivotally coupled to the distribution splice compartment 40 and configured to pivot between a first position covering the distribution overlength storage area 84 and a second position substantially exposing the distribution overlength storage area 84 (see also FIGS. 6A and 6B).

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An enclosure for providing a local convergence point for a fiber optic network, the enclosure comprising:
 an enclosure frame defining a longitudinal axis;
 an end panel coupled to the enclosure frame and defining a plurality of ports, each of the plurality of ports configured to receive an optical cable comprising a plurality of optical fibers;
 a feeder compartment associated with the enclosure frame and configured to receive through at least one of the plurality of ports an optical source cable in communication with a network comprising at least one optical signal source;
 a feeder compartment panel pivotally coupled to the feeder compartment and configured to pivot between a first position that at least partially encloses the feeder compartment and a second position substantially exposing an interior of the feeder compartment;

a feeder splice tray removably coupled to the feeder compartment panel and configured to receive at least one optical fiber from the optical source cable in communication with the network comprising the at least one optical communication source, wherein the feeder splice tray is configured to communicatively couple at least one of the plurality of optical fibers of the optical source cable to at least one distribution fiber configured to facilitate communication with a destination device configured to receive an optical signal from the network comprising the at least one optical signal source;

a distribution compartment associated with the enclosure frame;

at least one adaptor panel associated with the distribution compartment and configured to facilitate communicative coupling between at least one optical fiber of the plurality of optical fibers of the optical source cable and the at least one distribution fiber;

a distribution splice compartment associated with the enclosure frame, the distribution splice compartment comprising at least one distribution splice tray configured to communicatively couple the at least one distribution fiber and at least one destination fiber configured to be in communication with the destination device configured to receive an optical signal from the network comprising the at least one optical signal source; and a distribution splice compartment panel pivotally coupled to the distribution splice compartment and configured to pivot between a first position adjacent the enclosure frame and a second position substantially exposing a reverse side of the distribution splice compartment panel.

2. The enclosure of claim 1, wherein the feeder splice tray is configured such that at least one of the plurality of optical fibers of the optical source cable is communicatively coupled to the at least one distribution fiber in the feeder splice tray remotely from the enclosure.

3. The enclosure of claim 1, wherein the feeder compartment panel defines an overlength storage area configured to receive at least one loop of the optical source cable, wherein the feeder splice tray is located at a first end of the feeder compartment panel, and the overlength storage area is located between the feeder splice tray and a second end of the feeder compartment panel.

4. The enclosure of claim 1, further comprising at least one of an optical splitter, a multiplexer, a wave-division multiplexer, or a patch cable associated with the distribution compartment and configured to receive an optical signal from the at least one optical fiber of the plurality of optical fibers of the optical source cable.

5. The enclosure of claim 1, wherein the feeder compartment and the distribution compartment are located on opposite sides of the enclosure frame.

6. The enclosure of claim 1, wherein the at least one distribution splice tray is removably coupled to the distribution splice compartment such that at least one distribution fiber is communicatively coupled in the distribution splice tray remotely from the enclosure to at least one destination fiber configured to facilitate communication with a destination device configured to receive an optical signal from the network comprising the at least one optical signal source.

7. The enclosure of claim 1, wherein the at least one distribution splice tray is located at a first end of the distribution splice compartment remote from the plurality of ports, and the distribution splice compartment defines a distribution overlength storage area configured to receive at least one loop of distribution fibers, and wherein the distribution overlength storage area is located between the first end of the distribution splice compartment and a second end of the distribution splice compartment located adjacent the plurality of ports.

8. The enclosure of claim 7, further comprising a distribution splice compartment overlength panel pivotally coupled to the distribution splice compartment and configured to pivot between a first position covering the distribution overlength storage area and a second position substantially exposing the distribution overlength storage area.

9. An enclosure for providing a local convergence point for a fiber optic network, the enclosure comprising:

an enclosure frame defining a longitudinal axis;

an end panel coupled to the enclosure frame and defining a plurality of ports, each of the plurality of ports configured to receive an optical cable comprising a plurality of optical fibers;

a feeder compartment associated with the enclosure frame and configured to receive through at least one of the plurality of ports an optical source cable in communication with a network comprising at least one optical signal source;

a feeder compartment panel pivotally coupled to the feeder compartment and configured to pivot between a first position that at least partially encloses the feeder compartment and a second position substantially exposing an interior of the feeder compartment;

a feeder splice tray removably coupled to the feeder compartment panel and configured to receive at least one optical fiber from the optical source cable in communication with the network comprising the at least one optical communication source, wherein the feeder splice tray is configured such that at least one of the plurality of optical fibers of the optical source cable is communicatively coupled in the feeder splice tray remotely from the enclosure to at least one distribution fiber configured to facilitate communication with a destination device configured to receive an optical signal from the network comprising the at least one optical signal source;

a distribution compartment associated with the enclosure frame;

at least one adaptor panel associated with the distribution compartment and configured to facilitate communicative coupling between at least one optical fiber of the plurality of optical fibers of the optical source cable and the at least one distribution fiber;

a distribution splice compartment associated with the enclosure frame, the distribution splice compartment comprising at least one distribution splice tray configured to communicatively couple the at least one distribution fiber and at least one destination fiber configured to be in communication with the destination device configured to receive an optical signal from the network comprising the at least one optical signal source; and a distribution splice compartment panel pivotally coupled to the distribution splice compartment and configured to pivot between a first position adjacent the enclosure frame and a second position substantially exposing a reverse side of the distribution splice compartment panel.

10. The enclosure of claim 9, wherein the feeder compartment panel defines a overlength storage area configured to receive at least one loop of the optical source cable, wherein the feeder splice tray is located at a first end of the feeder compartment panel, and the overlength storage area is located the between the feeder splice tray and a second end of the feeder compartment panel.

11. The enclosure of claim 9, further comprising at least one of an optical splitter, a multiplexer, a wave-division multiplexer, or a patch cable associated with the distribution compartment and configured to receive an optical signal from the at least one optical fiber of the plurality of optical fibers of the optical source cable.

12. The enclosure of claim 9, wherein the feeder compartment and the distribution compartment are located on opposite sides of the enclosure frame.

13. The enclosure of claim 9, wherein the at least one distribution splice tray is removably coupled to the distribution splice compartment such that at least one distribution fiber is communicatively coupled in the distribution splice tray remotely from the enclosure to at least one destination fiber configured to facilitate communication with a destination device configured to receive an optical signal from the network comprising the at least one optical signal source.

14. The enclosure of claim 9, wherein the at least one distribution splice tray is located at a first end of the distribution splice compartment remote from the plurality of ports, and the distribution splice compartment defines a distribution overlength storage area configured to receive at least one loop of distribution fibers, and wherein the distribution overlength storage area is located between the first end of the distribution splice compartment and a second end of the distribution splice compartment located adjacent the plurality of ports.

15. The enclosure of claim 14, further comprising a distribution splice compartment overlength panel pivotally coupled to the distribution splice compartment and configured to pivot between a first position covering the distribution overlength storage area and a second position substantially exposing the distribution overlength storage area.

16. An enclosure for providing a local convergence point for a fiber optic network, the enclosure comprising:
an enclosure frame defining a longitudinal axis;
an end panel coupled to the enclosure frame and defining a plurality of ports, each of the plurality of ports configured to receive an optical cable comprising a plurality of optical fibers; and
a distribution splice compartment associated with the enclosure frame and comprising at least one distribution splice tray configured to be communicatively coupled to an optical source cable in communication with a network comprising the at least one optical communication source and facilitate communicative coupling with at least one distribution fiber configured to facilitate communication with a destination device configured to receive an optical signal from the network comprising the at least one optical signal source,
wherein the at least one distribution splice tray is removably coupled to the distribution splice compartment such that at least one distribution fiber is communicatively coupled in the distribution splice tray remotely from the enclosure to at least one destination fiber configured to facilitate communication with a destination device configured to receive an optical signal from the network comprising the at least one optical signal source, and
wherein the at least one distribution splice tray is located at a first end of the distribution splice compartment remote from the plurality of ports, and the distribution splice compartment defines a distribution overlength storage area configured to receive at least one loop of distribution fibers, and wherein the distribution overlength storage area is located between the first end of the distribution splice compartment and a second end of the distribution splice compartment located adjacent the plurality of ports.

17. The enclosure of claim 16, further comprising a distribution splice compartment panel pivotally coupled to the distribution splice compartment and configured to pivot between a first position adjacent the enclosure frame and a second position substantially exposing a reverse side of the distribution splice compartment panel.

18. The enclosure of claim 16, further comprising a distribution splice compartment overlength panel pivotally coupled to the distribution splice compartment and configured to pivot between a first position covering the distribution overlength storage area and a second position substantially exposing the distribution overlength storage area.

19. The enclosure of claim 16, further comprising a feeder compartment associated with the enclosure frame and configured to receive through at least one of the plurality of ports an optical source cable in communication with a network comprising at least one optical signal source.

20. The enclosure of claim 19, further comprising:
a feeder compartment panel pivotally coupled to the feeder compartment and configured to pivot between a first position that at least partially encloses the feeder compartment and a second position substantially exposing an interior of the feeder compartment; and
a feeder splice tray removably coupled to the feeder compartment panel and configured to receive the at least one optical fiber from the optical source cable in communication with the network.

21. The enclosure of claim 20, wherein the feeder splice tray is configured to communicatively couple at least one of the plurality of optical fibers of the optical source cable to at least one distribution fiber configured to facilitate communication with a destination device configured to receive an optical signal from the network comprising the at least one optical signal source.

22. An enclosure for providing a local convergence point for a fiber optic network, the enclosure comprising:
an enclosure frame defining a longitudinal axis;
an end panel coupled to the enclosure frame and defining a plurality of ports, each of the plurality of ports configured to receive an optical cable comprising a plurality of optical fibers;
a feeder compartment associated with the enclosure frame and configured to receive through at least one of the plurality of ports an optical source cable in communication with a network comprising at least one optical signal source;
a feeder compartment panel pivotally coupled to the feeder compartment and configured to pivot between a first position that at least partially encloses the feeder compartment and a second position substantially exposing an interior of the feeder compartment;
a feeder splice tray removably coupled to the feeder compartment panel and configured to receive at least one optical fiber from the optical source cable in communication with the network comprising the at least one optical communication source, wherein the feeder splice tray is configured to communicatively couple at least one of the plurality of optical fibers of the optical source cable to at least one distribution fiber configured to facilitate communication with a destination device configured to receive an optical signal from the network comprising the at least one optical signal source;

a distribution compartment associated with the enclosure frame;

at least one adaptor panel associated with the distribution compartment and configured to facilitate communicative coupling between at least one optical fiber of the plurality of optical fibers of the optical source cable and the at least one distribution fiber; and a distribution splice compartment associated with the enclosure frame, the distribution splice compartment comprising at least one distribution splice tray configured to communicatively couple the at least one distribution fiber and at least one destination fiber configured to be in communication with the destination device configured to receive an optical signal from the network comprising the at least one optical signal source, wherein the at least one distribution splice tray is located at a first end of the distribution splice compartment remote from the plurality of ports, and the distribution splice compartment defines a distribution overlength storage area configured to receive at least one loop of distribution fibers, and wherein the distribution overlength storage area is located between the first end of the distribution splice compartment and a second end of the distribution splice compartment located adjacent the plurality of ports.

23. An enclosure for providing a local convergence point for a fiber optic network, the enclosure comprising:

an enclosure frame defining a longitudinal axis;

an end panel coupled to the enclosure frame and defining a plurality of ports, each of the plurality of ports configured to receive an optical cable comprising a plurality of optical fibers;

a feeder compartment associated with the enclosure frame and configured to receive through at least one of the plurality of ports an optical source cable in communication with a network comprising at least one optical signal source;

a feeder compartment panel pivotally coupled to the feeder compartment and configured to pivot between a first position that at least partially encloses the feeder compartment and a second position substantially exposing an interior of the feeder compartment;

a feeder splice tray removably coupled to the feeder compartment panel and configured to receive at least one optical fiber from the optical source cable in communication with the network comprising the at least one optical communication source, wherein the feeder splice tray is configured such that at least one of the plurality of optical fibers of the optical source cable is communicatively coupled in the feeder splice tray remotely from the enclosure to at least one distribution fiber configured to facilitate communication with a destination device configured to receive an optical signal from the network comprising the at least one optical signal source;

a distribution compartment associated with the enclosure frame;

at least one adaptor panel associated with the distribution compartment and configured to facilitate communicative coupling between at least one optical fiber of the plurality of optical fibers of the optical source cable and the at least one distribution fiber; and a distribution splice compartment associated with the enclosure frame, the distribution splice compartment comprising at least one distribution splice tray configured to communicatively couple the at least one distribution fiber and at least one destination fiber configured to be in communication with the destination device configured to receive an optical signal from the network comprising the at least one optical signal source, wherein the at least one distribution splice tray is located at a first end of the distribution splice compartment remote from the plurality of ports, and the distribution splice compartment defines a distribution overlength storage area configured to receive at least one loop of distribution fibers, and wherein the distribution overlength storage area is located between the first end of the distribution splice compartment and a second end of the distribution splice compartment located adjacent the plurality of ports.

24. An enclosure for providing a local convergence point for a fiber optic network, the enclosure comprising:

an enclosure frame defining a longitudinal axis;

an end panel coupled to the enclosure frame and defining a plurality of ports, each of the plurality of ports configured to receive an optical cable comprising a plurality of optical fibers;

a distribution splice compartment associated with the enclosure frame and comprising at least one distribution splice tray configured to be communicatively coupled to an optical source cable in communication with a network comprising the at least one optical communication source and facilitate communicative coupling with at least one distribution fiber configured to facilitate communication with a destination device configured to receive an optical signal from the network comprising the at least one optical signal source, and wherein the at least one distribution splice tray is removably coupled to the distribution splice compartment such that at least one distribution fiber is communicatively coupled in the distribution splice tray remotely from the enclosure to at least one destination fiber configured to facilitate communication with a destination device configured to receive an optical signal from the network comprising the at least one optical signal source, wherein the at least one distribution splice tray is located at a first end of the distribution splice compartment remote from the plurality of ports, and the distribution splice compartment defines a distribution overlength storage area configured to receive at least one loop of distribution fibers, and wherein the distribution overlength storage area is located between the first end of the distribution splice compartment and a second end of the distribution splice compartment located adjacent the plurality of ports.

\* \* \* \* \*

UNITED STATES PATENT AND TRADEMARK OFFICE
CERTIFICATE OF CORRECTION

PATENT NO.        : 10,558,007 B2
APPLICATION NO.   : 16/298154
DATED             : February 11, 2020
INVENTOR(S)       : Brown et al.

Page 1 of 1

It is certified that error appears in the above-identified patent and that said Letters Patent is hereby corrected as shown below:

In the Claims

In Column 17, Line 6, Claim 10, after "located" delete "the".

Signed and Sealed this
Twenty-eighth Day of April, 2020

Andrei Iancu
*Director of the United States Patent and Trademark Office*